United States Patent [19]

Pauliukonis

[11] 4,231,399
[45] Nov. 4, 1980

[54] MOMENTARY CONTACT REVERSING DIVERTER

[76] Inventor: Richard S. Pauliukonis, 6660 Greenbriar Dr., Cleveland, Ohio 44130

[21] Appl. No.: 9,678

[22] Filed: Feb. 5, 1979

Related U.S. Application Data

[63] Continuation-in-part of Ser. No. 872,231, Jan. 25, 1978, Pat. No. 4,178,768.

[51] Int. Cl.³ .................. F16K 31/122; F16K 31/06; F16K 11/07
[52] U.S. Cl. ........................... 137/625.4; 137/625.48
[58] Field of Search ............ 137/625.64, 625.4, 625.48

[56] References Cited

U.S. PATENT DOCUMENTS

| | | | |
|---|---|---|---|
| 3,315,702 | 4/1967 | Passaggio | 137/625.64 |
| 3,913,620 | 10/1975 | Pauliukonis | 137/625.64 |

FOREIGN PATENT DOCUMENTS

| | | | |
|---|---|---|---|
| 1487472 | 5/1967 | France | 137/625.64 |

*Primary Examiner*—Arnold Rosenthal
*Attorney, Agent, or Firm*—Richard S. Pauliukonis

[57] ABSTRACT

A three ported momentary contact diverter that doubles as a mixer valve, having a housing with a central bore passing therethrough including an axially movable elongated stem slidably received therein, and closed at each end by electrical solenoid operators, allows a pressurized fluid flow from a first fluid supply port to a second fluid receiver port when neither of the solenoids is electrically energized, and reverses the fluid flow from the first fluid supply port to a third fluid receiver port when simultaneously both solenoid operators become electrically energized momentarily to permit pressurized pilot fluid from the supply port to enter-solenoid cavity via internally piloted fluid passages inside said elongated stem initiating each with a separate pilot opening in an overlapping relationship at the opposite sides of a central stem piston, comprising valving means, so as to permit pressurization of a first stem end by said pilot fluid while a second stem end is de-pressurized, with resultant stem movement from the original first position with fluid communication between said first and second ports to a second position with fluid communication between said first and third ports when the valve is used as a reversing diverter, whereas when the valve is used as a mixer, the second and third ports are connected to two different fluid supply sources under pressure and the third port is connected to a receiver of mixed fluids received via single first port alternatingly, and the solenoid operators could be energized individually for the reversal of fluids to be delivered to the receiver port while solenoid cavities may be provided with additional individual exhaust ports, adaptable to be connected to the low pressure of the system, if desired.

4 Claims, 2 Drawing Figures

MOMENTARY CONTACT REVERSING DIVERTER

This application for patent is a continuation-in-part of the application entitled INTERNALLY PILOTED REVERSING VALVES FOR HEAT PUMP, filed Jan. 25, 1978 under Ser. No. 872,231, presently allowed to issue as U.S. Pat. No. 4,178,768.

The fundamentals of the novel means of internally piloted reversing valves with five ports, disclosed in the parent invention identified above, were found extremely useful for simplification of other solenoid valves of this general type. Specifically, it was determined that application of the novel means to incorporate separate pilot fluid overlapping passages within a single stem operating in conjunction with two individual solenoid operators adaptable to momentary contact electrically to conserve energy can materially simplify the design of reversing diverters and valves used for mixing two streams of fluids in a novel 3-ported valve of the present invention. Obviously, devices that entail design simplification to the extend this invention permits resulting in energy conservation when in operation due to the momentary contact provisions are urgently needed.

The principle object of the invention is to introduce a new principle of operation in momentary contact valves and thereby to eliminate the costly need to have solenoids, energized, such as the case is with conventional valves of this type, subject to electrical energization for at least 50% of their service life wasting energy, in contrast to the present momentary energization with means of energy conservation.

Related objects in this connection are, accordingly, to reduce the design complexity by reduction of parts and to present a diverter constructed from basically a simple valving stem slidable inside a straight housing bore closed at each end by commercial solenoid operators, characterized by simple and inexpensive valve that doubles as a mixer and entails reliable and efficient operation.

A further object is to obviate the need for excessive amount of seals in a diverter serving as a reversing valve in refrigeration and cooling systems subject to long service life. Still another object is to eliminate compression springs from valving means while retaining a moving force capability within the stem in the desired direction by application of fluid pressure forces thereto.

Other objects and structural details of the invention will become more apparent to those skilled in the art from the following description when read with the accompanying drawings.

IN THE DRAWINGS

Figure 1:
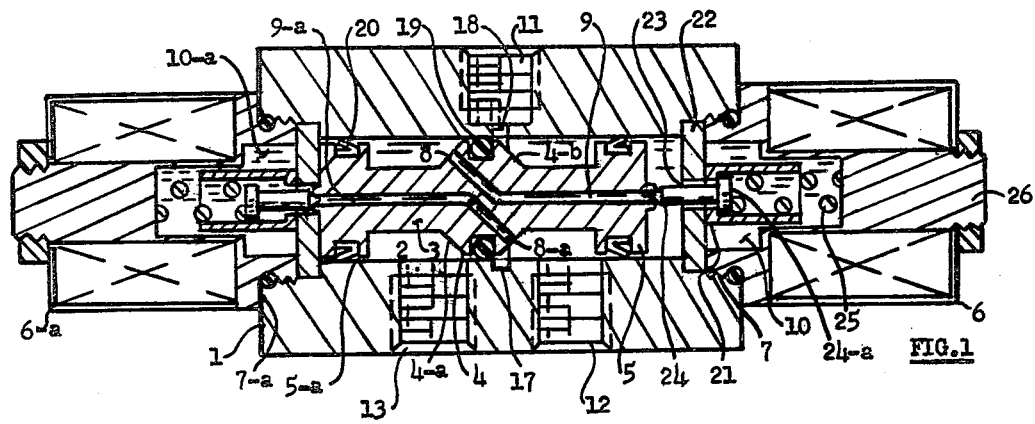
FIG. 1 is a cross-sectional view of the diverter embodying the present invention with solenoid operators mounted inside valve housing ends.
Figure 2:
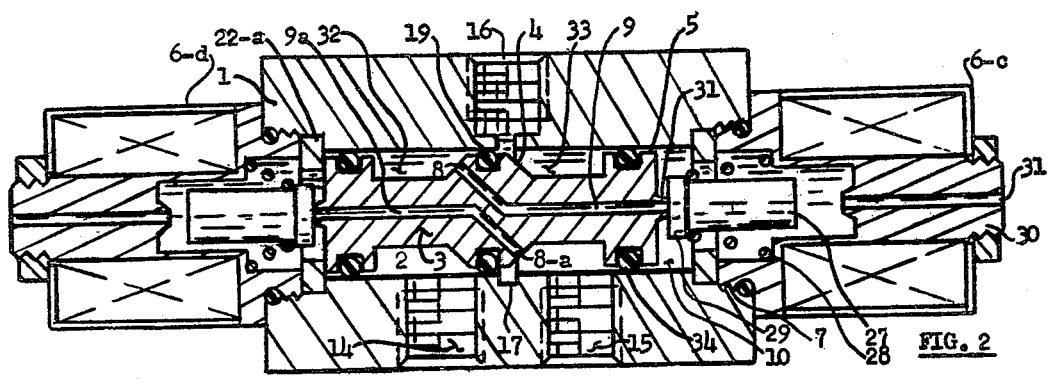
FIG. 2 is a cross-sectional view of the same diverter when it serves as a mixer thereby entailing slight modifications in seals and in solenoid operators.

Valves of FIG. 1 and FIG. 2 include identical valve housing 1 with a bore 2 passing therethrough and adaptable of receiving slidably an elongated identical valving stem 3 having a central piston 4 with identical integral end pistons 5 and 5-a including two identical electrical solenoid operators 6 and 6-a secured inside housing bore ends 7 and 7-a in an operable relationship with pistons 5 and 5-a. Identical pilot fluid passages 9 and 9-a inside stem 3 initiate adjacent or inside piston 4 in an overlapping relationship therebetween, and a first pilot port 8 for pilot fluid exhaust through stem 3 from a solenoid cavity 10 via first passage 9 starts inside piston face 4-a facing bore end 7-a while a second pilot port 8-a for supplying fluid under pressure via second passage 9-a to identical solenoid cavity 10-a starts inside piston face 4-b. In general, features rarely found or attainable with valves of prior art include a simple, one piece valve housing 1 with a straight through bore 2 and three perpendicular fluid ports of which only two are allowed to communicate at one time as controlled by valving stem 3 with three pistons of identical diameter slightly smaller than the diameter of the housing bore 2 to facilitate sliding fit therewith. The only difference between valves shown is in the application, and the valve of FIG. 1 is intended to serve as common diverter, characterized by the ability to divert the flow of pressurized fluid from a single supply port 11 entering bore 2 perpendicularly substantially midway of the housing length to commumicate with either a first receiver port 12, when valve is in a first position shown in FIG. 1 or a second receiver port 13 when stem position is changed (not shown), and subsequently reversing the positions from the first to the second, and vice versa, wherein receiver ports 12 and 13 are alternatingly experiencing lower pressure than that prevailing when fluid communication between inlet port 11 and the respective receiver port is established. FIG. 1 represents typical diverter valve with supply port 11 in communication with the first receiver port 12 experiencing higher pressure than the pressure prevailing in the second receiver port 13, disconnected from it.

The application of valve of FIG. 2 may indeed be the diverter's as well, but for purpose of clarification, it may be designated as a mixer, characterised by the fact that the ports 14 and 15 represent individual supply ports of two different fluids under pressure, which have to be flowed into receiver via a single port 16 alternatingly. Shown in FIG. 2 is a fluid communication patterns from port 15 to port 16 experiencing a fluid pressure which may be equal to the fluid pressure prevailing in port 14. When stem 3 is moved from the left position of FIG. 2 to the right position, resulting in a position change from the first shown in the FIG. 2 to the second position (not shown), port 15 simply becomes disconnected while the communication between ports 14 and 16 becomes established and, subsequently reversed, and vice versa, providing simple means for the port 16 to alternatingly receive two streams of different fluids, illustrating an inherent valve versatility and conversion from diverter to mixer by virtue of simple interconnection of ports, rarely found in the valves of prior art.

Returning back to diverter of FIG. 1 we find that port 11 discharges inwardly into a radial recess 17 facilitating a narrow passage for main seal 19 of piston 4 to cross when stem 3 is urged to change positions inside valve delivering large fluid flows therethrough. For smaller flows, recess 17 may be omitted and the flow may be allowed to enter valve bore 2 via simple orifice 18 at the bottom of the port 11. The same pertains to valve of FIG. 2 which needs a radial groove or recess 17 at the bottom of port 16 only if the mixer valve is designated to serve very large flows, otherwise groove 17 is optional. Likewise is optional seal 20 of U-cup configuration shown inside pistons 5 and 5-a of FIG. 1 because the diverter shown therein requires no seals in end pistons if clearances between bore 2 diameter and the outside diameters of pistons 5 and 5-a respectively are small. In essence, it is to the advantage in the diverter operation to have presssurized fluid enter cavities 10 and 10-a respectively via clearances already described due to additional force piston 5 of FIG. 1 experiences when stem 3 is in the position shown therein and the fluid entering cavity 10 via such clearance exerts an end thrust (force) over piston face exposed thereto, to augment thrust force piston face 4-b is subjected to, thereby insuring stem position driftless. If clearances between the outside diameters of pistons 5 and 5-a and bore 2 are large, as may, indeed, be the case with larger valves necessitating large dimensions of valve components subject to larger tolerances inherently, and for purpose of reduced manufacturing costs of such components, it is recommended to use U-cup seals in diverters shown in FIG. 1, provided such seals are inserted into their respective grooves with U-cup channels toward the stem ends, as illustrated in drawing FIG. 1. This type of mounting of seals 20 inside piston grooves serves dual purpose, namely, outwardly oriented seal channels will allow a by-pass of pressurized fluid flowed between ports 11 and 12 into cavity 10 subjecting piston 5 to said additional end thrust in the same fashion it exerted when no seals were used, when the diverter is in a first position as shown in FIG. 1, and also later, such channels may greatly contribute to sealing during build-up of a pressure force inside the opposite cavity 10-a at piston 5-a when stem 3 is urged to axially move to the second position to divert fluid flow from port 11 to port 13, as will be apparent from the ensuing discussion.

Pilot passages 9 of stem 3 of FIG. 1 and FIG. 2 are shown closed by the solenoid plungers located in the solenoid cavities 10 and 10-a. FIG. 1 shows a hollow plunger 21 backed up by a washer 22 with a hole 23 for a plunger pin 24 to protrude so as to enter and keep stem passages 9 normally closed by springs 25 lodged between solenoid iron 26 facing solenoid cavities thereof and a pin head 24-a. This type of plunger construction allows an increased travel of stem 3 axially within the boundaries provided by washers 22 at each opposite housing ends, thereby increasing utilization for this type of diverter valves in very large sizes, including those found in petroleum and energy related fields, as well as refrigeration and cooling systems & process industry. Diverter operation is also simple and unique. Unlike conventional valves and diverters of prior art, this valve operates by momentary actuation electrically, called momentary contact throughout the trade, which includes energization of both solenoid operators simultaneously, by a simple wire hook up of both operator coils to a single contact switch instead of connecting such wires to individual terminals as will be the case with the mixer valve of FIG. 2. This simultaneous coil energization of the diverter of FIG. 1 does the following. First, when solenoid operator is electrically energized, plunger 21 becomes attracted to then magnetic iron 26 lifting pin 24 to open passage 9 of piston 5 and unload cavity 10 from pressurized fluid via pilot port 8 into port 13 thereby reducing and/or eliminating end force from piston 5 while simultaneously pressurizing cavity 10-a with pilot fluid delivered through piston 5-i a via pilot passages 9 of stem 3 initiating in high pressure region at central piston face 4-b provided with pilot port 8-a, thereby creating a new end thrust (end-force) in opposite direction to the original force direction which in turn forces stem 3 to move axially from the original first position to the second position which is quickly attained when seal 19 of central piston 4 crosses central fluid supply port orifice 18 including radial groove 17 disconnecting port 12 and establishing fluid communication between ports 11 and 13 instead. New forces developed by fluid pressure will prevail over piston face 4-a and end piston 5-a. In this connection it may be appropriate to note that the use of U-cup seal is, indeed, beneficial here, since it permits instant pressurization of cavity 10-a due to the direction of seal channels therein facing pressure supplied via passages 9 without the need to have large pilot ports with excess delivery of pilot fluid for stem position change which without U-cup seals in piston 5-a would have been unavoidable. Likewise, U-cup seal in piston 5 would yield beneficial results during stem return to the original first position, and vice versa. Obviously, diverter of FIG. 1 would have operated identically if plunger of FIG. 2 were used instead of pin 24, with equal results, without departing from the diverter invention. In fact, the use of O-rings 34 in lieu of U-cups 20 would not impair diverter operation except for previously noted additional end thrust that prevails behind pistons 5 and 5-a with position changes respectively to insure fixed and driftless stem position selected. The ultimate choice of seals for pistons 5 and 5-a is therefore optional and basically fluid dependent, including consideration of factors such a flows, pressures and valve sizes. Since de-energization of solenoid operators electrically is automatic in momentary contact valves, i.e. since valves are energized for a short moment through electrical contact regulated by an appropriate switch, the operation of valves of this invention conserves energy when compared to the valves of prior art of this general type, which must be energized electrically approximately 50% of their service life, wasting energy. The ability to operate diverter of this invention momentarily is due to the design which uses fluid dynamics wherein piston surfaces when exposed to the working fluid entering supply port 11 perform stem shifting with the position change through forces piston 5 and 5-a experience in conjunction with forces over the sides of piston 4 alone or in combination therewith. It is to note that FIG. 1 diverter could operate when either of the solenoid operators are energized individually, if used with a compressible fluids such as compressed air which manages to escape from solenoid cavities back into the low pressure side of the system it serves. Experiments with liquids however indicated that non-compressible fluids evacuate cavities better when both operators are energized simultaneously, unless the solenoid cavity could be vented by an additional fluid exhaust port as that shown in FIG. 2 illustrating this and other associated obvious modifications without departing from the spirit and scope of the present invention.

In FIG. 2 a plunger 27 with head 29 of solenoid operators 6-c and 6-d at each housing bore ends 7 and 7-a respectively maintains central pilot passages 9 and 9-a of stem 3 closed by a spring 28 lodged between plunger head 29 and shoulder inside solenoid cavity while iron 30 thereof receives a pilot exhaust port 31 adaptable to be connected to a low pressure reservoir of the system or simply left atmospheric during the period solenoid is de-energized, rendering cavity depressurized until solenoid is energized developing magnetic pull force capable of moving plunger 27 to open passage 9 while closing exhaust 31, rendering such cavity pressurized by the pilot fluid exerting a pressure force over end piston face of a magnitude larger than the force fluid develops over the piston side of piston 4 exposed to the fluid flow between communicating ports, resulting in stem position change by one cavity pressurized while the other cavity is de-pressurized redirecting the original fluid communication through the valve accordingly. De-energization of individual solenoid operators takes place immediately after the valving stem 3 of FIG. 2 shifts, rendering this valve likewise of the momentary contact type which saves energy, since further positioning of the stem inside bore becomes fixed by the fluid pressure over the side of the piston 4 which is exposed thereto while the solenoid cavity becomes de-pressurized via solenoid exhaust port 31 enabling subsequent stem position change without undue force resistance from fluid captured inside the solenoid cavities when opposite solenoid operator becomes electrically energized, and vice versa. Obviously, the operation of FIG. 2. valve requires O-ring seals in all piston grooves, to insure separation of solenoid cavities from fluid chamber 32 provided with supply port 14 and fluid chamber 33 provided with supply port 15, both chambers separated from each other by the main piston seal 19 of the central piston 4, in identical fashion fluid is separated in FIG. 1 valve, except that in the mixer valve of FIG. 2 all piston seals must be employed for proper valve operation while in diverter valve of FIG. 1 only seal 19 of central piston 4 is mandatory, as per preceding description, identifying other piston seals as optional.

To prevent deadlocked stem when piston 4 of FIG. 1 diverter lines up with port 11 initially preventing fluid supply into the valve, radial bore recess 17 with orifice 18 could be shifted slightly away from the center on purpose, in the design stages by determining shift dimension corresponding to the dimension of seal 19 which in the final analysis is valve size dependent because for smaller valves, cross-section of seal 19 will be smaller permitting smaller dimensional shift. Obviously, other means may be employed for prevention of deadlock condition such as increased friction of seals, varying force of plunger springs 25 or 28, including utilization of magnetic material for washer 22-a shown in FIG. 2 for stem locking in position fixed.

It will be understood that the invention has a scope unlimited by specific details of the illustrated embodiment thereof and that it is susceptible to modifications without departing from the scope of the invention defined by the following claims.

What is claimed is:

1. A momentary contact valve for selectively porting pressurized fluid comprising:

a multiported valve housing having a first and a second ends interconnected by an axially extending bore passing therethrough and closed by an identical electrical solenoid operator at each opposite housing end including a central solenoid plunger movable selectively between an open position when said operator is momentarily energized electrically and a closed position when said operator is de-energized, including a fluid supply and discharge port means incorporated therein, a valving means inside said bore slidable between a first and a second positions selectively porting fluid flow through said valve including an elongated stem with a centrally located valve piston provided with pilot ports initiating therein in an overlapping relationship therebetween so as to have a first pilot port start on the right side of said valve piston and extend generally longitudinally through said stem discharging on the left stem end provided with a first integral end piston while a second pilot port starts on the left side of said valve piston and extends through said stem longitudinally for discharge on the right stem end provided with a second integral end piston, with pilot discharge ports inside said end pistons closed by said solenoid plungers, including a valve shifting means with said position change of said valving means and means for maintaining said valving means in one of said positions driftless.

2. A momentary contact valve as in claim 1 wherein said multiported valve housing includes at least three fluid ports entering said bore perpendicularly and a first port entering said bore substantially midway thereof while a second and third ports enter said bore a short distance away therefrom along the housing length each on the opposite side of said first port, together comprising said fluid supply and discharge port means of said housing, and when said valving means is in said first position, fluid communication is established between two of said ports while the third port is disconnected, and when said valving means is in said second position, fluid communication is established between said third port and one of the ports formerly allowing fluid flow therethrough while the other of formerly communicating ports becomes disconnected, and vice versa, when said valving means is moved inside said bore within limits provided therein.

3. A momentary contact valve as in claim 1 wherein said operators inside said bore ends define at each housing end a first and a second solenoid cavities adaptable of receiving said solenoid plungers disposed therein in an operable relationship with said end pistons, and said plungers connected to shift said stem inside said housing bore between said first and said second positions of said valving means when one of said plungers is moved to an open position allowing pilot fluid flow to cause pressure build-up in said first solenoid cavity exerting end force over said first end piston larger than the opposing force over said second end piston in said second solenoid cavity, said force differential comprising said valve shifting means with said position change therein.

4. A momentary contact valve as in claim 1 wherein said operators inside said bore ends define at each housing end a first and a second solenoid cavities adaptable of receiving said solenoid plungers disposed therein in an operable relationship with said end pistons, and said plungers connected to shift said stem inside said housing bore between said first and said second positions of said valving means when both of said plungers are moved to an open position allowing pilot fluid flow into said first solenoid cavity for pressurization of said first end piston while said second solenoid cavity is de-pressurized causing force differential to prevail over said end pistons with subsequent position change of said valving means comprising said valve shifting means.

* * * * *